United States Patent
Jeong

(10) Patent No.: US 11,575,964 B2
(45) Date of Patent: Feb. 7, 2023

(54) DISPLAY APPARATUS FOR MANAGING WINDOW BUFFER ALLOCATION AND METHOD FOR CONTROLLING DISPLAY APPARATUS

(71) Applicant: SAMSUNG ELECTRONICS CO., LTD., Suwon-si (KR)

(72) Inventor: Seonghun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 16/978,419

(22) PCT Filed: Mar. 5, 2019

(86) PCT No.: PCT/KR2019/002490
§ 371 (c)(1),
(2) Date: Sep. 4, 2020

(87) PCT Pub. No.: WO2019/172593
PCT Pub. Date: Sep. 12, 2019

(65) Prior Publication Data
US 2021/0044865 A1  Feb. 11, 2021

(30) Foreign Application Priority Data
Mar. 5, 2018 (KR) .......... 10-2018-0025786

(51) Int. Cl.
H04N 21/443 (2011.01)
H04N 21/262 (2011.01)

(52) U.S. Cl.
CPC ... *H04N 21/4435* (2013.01); *H04N 21/26233* (2013.01); *H04N 21/26291* (2013.01); *H04N 21/4438* (2013.01)

(58) Field of Classification Search
CPC ......... H04N 21/4435; H04N 21/26233; H04N 21/26291; H04N 21/4438
See application file for complete search history.

(56) References Cited

U.S. PATENT DOCUMENTS

| | | | |
|---|---|---|---|
| 4,914,607 A | 4/1990 | Takanashi et al. | |
| 5,291,188 A | 3/1994 | McIntyre et al. | |
| 5,720,016 A | 2/1998 | Egashira | |
| 5,995,103 A * | 11/1999 | Ashe | G09G 5/14 715/804 |

(Continued)

FOREIGN PATENT DOCUMENTS

| | | |
|---|---|---|
| JP | 6-131142 A | 5/1994 |
| KR | 10-2005-0076404 A | 7/2005 |

(Continued)

OTHER PUBLICATIONS

Extended European Search Report dated Nov. 16, 2020 in European Patent Application No. 19764056.8.

(Continued)

*Primary Examiner* — Jefferey F Harold
*Assistant Examiner* — Franklin S Andramuno
(74) *Attorney, Agent, or Firm* — Staas & Halsey LLP

(57) ABSTRACT

A display device includes a display, a memory, and a processor that runs at least one application on the memory and allocates a window buffer for each of the at least one application to the memory.

15 Claims, 5 Drawing Sheets

(56) References Cited

U.S. PATENT DOCUMENTS

| | | |
|---|---|---|
| 6,366,289 B1 | 4/2002 | Johns |
| 7,065,630 B1 | 6/2006 | Ledebohm et al. |
| 7,302,648 B1 | 11/2007 | Brunner et al. |
| 8,255,826 B2 | 8/2012 | Brunner et al. |
| 9,197,933 B2 | 11/2015 | Woo |
| 9,712,848 B2 | 7/2017 | Cheung et al. |
| 2005/0168471 A1* | 8/2005 | Paquette .................. G09G 5/14 |
| | | 345/545 |
| 2009/0309808 A1 | 12/2009 | Swingler |
| 2013/0167076 A1 | 6/2013 | Brunner et al. |
| 2017/0262960 A1 | 9/2017 | Cheng |
| 2017/0352172 A1* | 12/2017 | Lim ...................... G06T 1/0021 |

FOREIGN PATENT DOCUMENTS

| | | |
|---|---|---|
| KR | 10-0524463 B1 | 10/2005 |
| KR | 10-2013-0039628 A | 4/2013 |

OTHER PUBLICATIONS

International Search Report dated Jul. 3, 2019 in corresponding International Patent Application No. PCT/KR2019/002490.

* cited by examiner

DISPLAY APPARATUS FOR MANAGING WINDOW BUFFER ALLOCATION AND METHOD FOR CONTROLLING DISPLAY APPARATUS

CROSS-REFERENCE TO RELATED APPLICATIONS

This application is a U.S. National Stage Application which claims the benefit under 35 U.S.C. § 371 of International Patent Application No. PCT/KR2019/002490 filed on Mar. 5, 2019, which claims foreign priority benefit under 35 U.S.C. § 119 of Korean Patent Application No. 10-2018-0025786 filed on Mar. 5, 2018 in the Korean Intellectual Property Office, the contents of both of which are incorporated herein by reference.

TECHNICAL FIELD

Embodiments disclosed in the disclosure relate to technologies of allocating window buffers.

BACKGROUND ART

A display device may display an image of content, which is stored in its memory or is received from an external device, on its display to provide a user with the image. The display device may display a specified image by storing the specified image and displaying the stored image on the display.

Recently, with the development of multimedia technologies, as high-definition and high-quality images have been actively provided, high definition (HD) image and ultra high definition (UHD) images, each having resolution of more than 4 times of HD have been provided. Thus, storage capacity for storing high-definition and high-quality images has been increased.

DISCLOSURE

Technical Problem

A display device may allocate a window buffer for displaying an image of a run app depending on whether the app is run. As the display device collectively allocates window buffers to the memory for the run app irrespective of whether the app is displayed on its display, it inefficiently uses the memory. Furthermore, in an environment where the display device uses a large amount of buffer to output high-definition and high-quality images, the inefficient use of the memory in limited memory resources has become a big problem.

A display device according to various embodiments of the disclosure may efficiently use a memory by variably allocating a window buffer allocated to the memory for the run app.

Technical Solution

In accordance with an aspect of the disclosure, a display device is provided. The display device may include a display, a memory, and a processor configured to run at least one application on the memory and allocate a window buffer for each of the at least one application to the memory. The processor may be configured to collect the window buffer allocated to the memory for the at least one application based on a state where at least a portion of an image by the at least one application is not displayed on the display, in a state where the state where the at least one application is running is maintained.

In accordance with another aspect of the disclosure, a method for controlling a display device is provided. The method may include determining a window buffer allocated to a memory for a run application based on a state where at least a portion of an image by at least one application is not displayed on a display, in a state where a state where the at least one run application is running is maintained and collecting a window buffer allocated to the memory for an application, the image of which is not displayed on the display, in response to the determination.

In accordance with another aspect of the disclosure, a non-volatile storage medium is provided. The non-volatile storage medium may store a program for performing a method including determining a window buffer allocated to a memory for a run application based on a state where at least a portion of an image by at least one application is not displayed on a display, in a state where a state where the at least one run application is running is maintained and collecting a window buffer allocated to the memory for an application, the image of which is not displayed on the display, in response to the determination.

Advantageous Effects

According to embodiments disclosed in the disclosure, the display device may efficiently use limited memory resources by variably collecting or allocating (or collecting) a window buffer allocated to the memory depending on a state of an app, an image of which is not displayed on the display, among the run apps.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure. With regard to description of drawings, similar denotations may be used for similar components.

Figure 1:
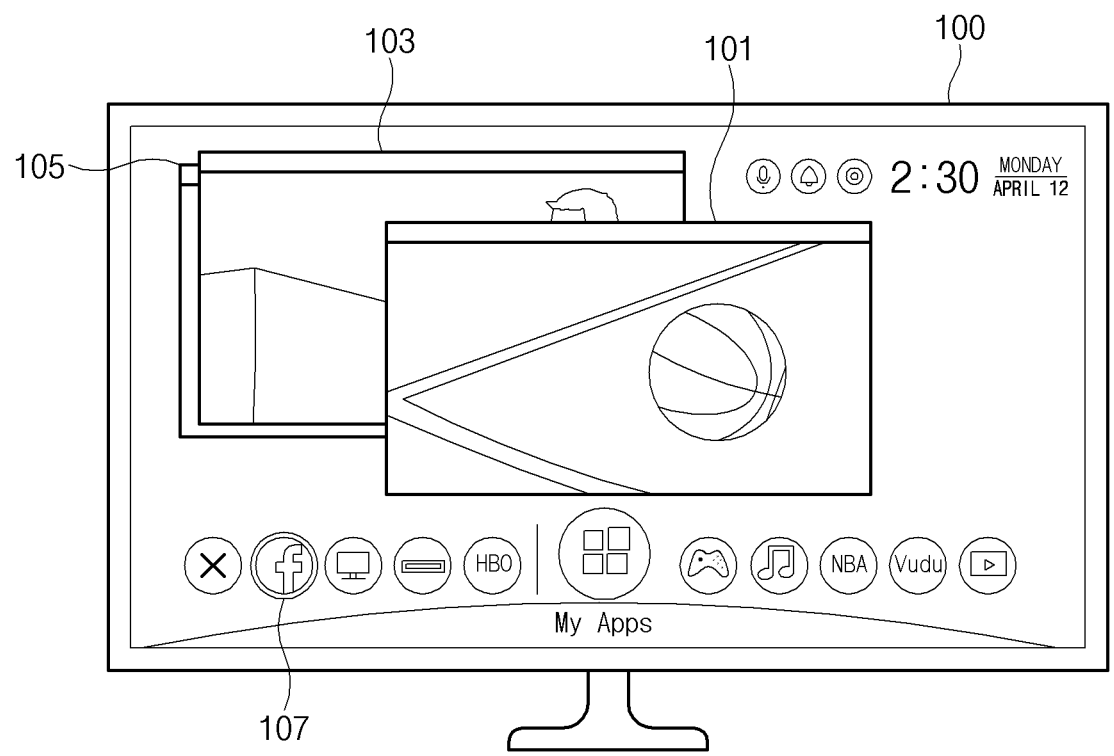
FIG. 1 is a drawing illustrating a display device according to various embodiments of the disclosure.

FIG. 1 is a drawing illustrating a display device according to various embodiments of the disclosure.

Referring to FIG. 1, a display device 100 may output a specified image (or video image) on its display.

According to an embodiment, the display device 100 may display the specified image on the display. For example, the display device 100 may display an image stored in its memory or may output an image received from an external device.

According to an embodiment, the display device 100 may output a specified image on each of a plurality of windows. For example, the display device 100 may output the specified image on each of a first window 101, a second window 103, and a third window 105. The first window 101, the second window 103, and the third window 105 may be overlapped and displayed on, for example, the display. In other words, at least some of the first window 101, the second window 103, and the third window 105 may be overlapped with each other to fail to display an image output on the display.

For example, the whole of the first window 101 may be displayed on the display. In other words, the whole of the image displayed on the first window 101 may be displayed on the display. The second window 103 may be at least partially overlapped with the first window 101, and the other part except for the overlapped part may be displayed on the display. In other words, only at least a portion of the image displayed on the second window 103 may be displayed on the display. The whole of the third window 105 may be overlapped with the second window 103. In other words, the whole of the image displayed on the third window 105 may fail to be displayed on the display.

According to an embodiment, the display device 100 may run an application program (or an app) and may perform a specified operation by means of the run app. The specified operation may be to provide a user with, for example, content or may provide the user with a service (e.g., reservation of performance or food order). According to an embodiment, the display device 100 may display an image of the run app on the display. For example, the display device 100 may display the image of the run app on the display through a window. The image of the app may include, for example, a user interface (UI) image.

According to an embodiment, the display device 100 may allocate a window buffer to the memory for each of run apps to display the image of the run app on the display. For example, the display device 100 may allocate a plurality of window buffers (e.g., 2 window buffers) to the memory for the run app.

According to an embodiment, the display device 100 may run a plurality of apps. According to an embodiment, the display device 100 may display UIs of some of the plurality of run apps on the display and may fail to display UIs of the others on the display. For example, the display device 100 may hide a window which displays images of the plurality of run apps. The display device 100 may display an indicator 107 corresponding to a hidden app on the display. According to an embodiment, when receiving a specified user input, the display device 100 may display a UI of an app, which is not displayed on the display, among the run apps on the display. The specified user input may be, for example, a user input selecting the indicator 107 displayed on the display.

The display device 100 may allocate a window buffer for displaying an image of a run app to the memory depending on whether the app is run. In other words, the display device 100 may allocate window buffers, for apps collectively run irrespective of whether they are displayed on the display, to the memory. Thus, the display device 100 may fail to efficiently use the memory. The display device 100 according to various embodiments of the disclosure may variably allocate (or collect) a window buffer allocated to the memory for the run app to efficiently use the memory.

Figure 2:
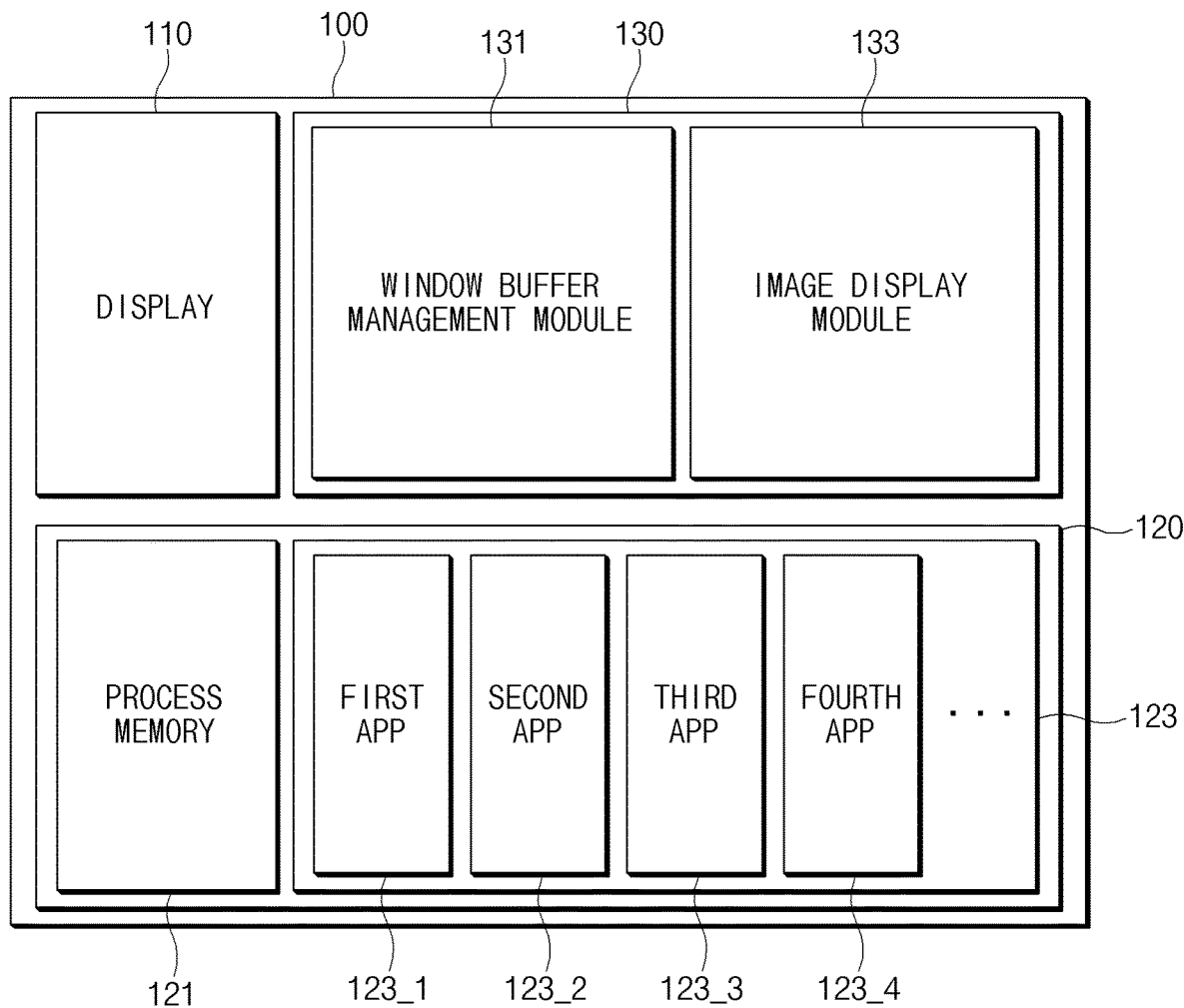
FIG. 2 is a block diagram illustrating a configuration of a display device according to various embodiments of the disclosure.

FIG. 2 is a block diagram illustrating a configuration of a display device according to various embodiments of the disclosure.

Referring to FIG. 2, a display device 100 may include a display 110, a memory 120, and a processor 130.

According to an embodiment, the display 110 may display an image. For example, the display 110 may display an image of content or an image of a run app. The image may include, for example, a UI image of the run app. According to an embodiment, the display 110 may output an image on a window. For example, the display 110 may display an image of the run app on each of a plurality of windows.

According to an embodiment, the memory 120 may include a process memory 121 and an application memory 123. According to an embodiment, the process memory 121 may store information necessary for performing a specified function. For example, the process memory 121 may store an image (e.g., a frame image of a video image) which is allocated to a window buffer for the run app and is displayed on the display 110. According to an embodiment, the application memory 123 may store a plurality of apps 123-1 to 123-4. The plurality of apps 123-1 to 123-4 may be applications for performing a specified function. According to an embodiment, the app stored in the application memory 123 may be stored and run on the process memory 121. In other words, instructions of the app stored in the application memory 123 may be stored in the process memory 121, and an operation may be performed according to the instructions stored in the process memory 121.

According to an embodiment, the memory 120 may include a volatile memory, such as a random access memory (RAM), and a non-volatile memory, such as a hard disk drive (HDD), a solid state drive (SSD), or a secure digital (SD). The process memory 121 may be implemented as, for example, the volatile memory, and the application memory 123 may be implemented as, for example, the non-volatile memory.

According to an embodiment, the processor 130 may be operatively connected with the display 110 and the memory 120 to control an overall operation of the display device 100. According to an embodiment, the processor 130 may control the display 110 and the memory 120 to display an image on the display 110.

According to an embodiment, the processor 130 may run at least one of the plurality of apps 123_1 to 123_4 stored in the application memory 123 to perform a specified function. According to an embodiment, when running the app, the processor 130 may allocate at least a part of the process memory 121 to store information for performing the specified function for the run app.

According to an embodiment, the processor 130 may display an image of the run app on the display 110. For example, the processor 130 may display the image of the run app on the display 110 through a window. The image may include, for example, a UI image of the run app. According to an embodiment, the processor 130 may display images of the plurality of run apps on the display 110. The processor 130 may overlap and display a plurality of windows on which the images of the plurality of run apps are displayed. For example, the processor 130 may overlap and display UIs of the run first app 123_1, the run second app 123_2, the run third app 123_3, and the run fourth app 123_4 on the display 110. According to an embodiment, the processor 130 may include a window buffer management module 131 and an image display module 133 to display the image of the run app on the display 110.

According to an embodiment, the window buffer management module 131 may manage a window buffer allocated to the memory 120 to display an image on the display 110. For example, the window buffer management module 131 may allocate window buffers for displaying an image on the display 110 to the process memory 121 for the plurality of run apps 123_1 to 123_4. The image may include, for example, images (or UI images) of the plurality of run apps 123_1 to 123_4.

According to an embodiment, when at least one app is executed, the window buffer management module 131 may allocate a window buffer for displaying an image on the display 110 to the memory 120 for the run app. For example, the window buffer management module 131 may allocate a plurality of window buffers (e.g., two window buffers) for storing an image to be displayed on the display 110 in the run app to the process memory 121. The plurality of window buffers may include, for example, two window buffers. The two window buffers may include, for example, a front window buffer for storing a first image currently displayed on the display 110 in at least one run app. Furthermore, the two window buffers may include a back window buffer for storing a second image displayed on the display 110, which is subsequent to the first image stored in the front window buffer. The first image and the second image may be, for example, consecutive frames included in a video image. The second image may be, for example, a frame subsequent to the first image.

According to an embodiment, the image display module 133 may display the result of being run through the app on the display 110. For example, the image display module 133 may display an image stored in the window buffer allocated to the memory 120 for the run app on the display 110. The window buffer may be, for example, the front window buffer. According to an embodiment, when the image display module 133 displays the image stored in the front window buffer on the display 100, the window buffer management module 131 may allocate (or specify) a back window buffer to the front window buffer. According to an embodiment, the window buffer management module 131 may allocate an old front window buffer to the back window buffer or may allocate a new window buffer to the back window buffer.

According to an embodiment, the window buffer management module 131 may collect the window buffer allocated to the memory 120 for the run app, based on a state where at least a portion of the image by the run app is not displayed on the display 110. According to an embodiment, the window buffer management module 131 may collect the window buffer allocated to the memory 120 for the run app, based on a state where the image by the run app is displayed on the display 110. For example, when a state where the app, the at least a portion of the image of which is not displayed, is run is maintained, the window buffer allocated to the memory 120 for the run app may be collected. Thus, two or less window buffers for at least one run app may be allocated to the memory 120.

According to an embodiment, the window buffer management module 131 may collect a window buffer allocated to the memory 120 for an app, at least a portion of an image (or a UI image) of which is not displayed on the display 110, in order of ranking (or priority) where the window buffer should be first allocated. The window buffer management module 131 may collect a window buffer allocated for an app, the priority of which is low. The specified priorities may be determined based on at least one of, for example, a state where an app is displayed on the display 110, a frequency where a user runs the app, and a time when the app is run. According to an embodiment, the window buffer management module 131 may collect the window buffer allocated to the memory 120 for an app, at least a portion of the image of which is not displayed on the display 110 among the run apps. For another example, the window buffer management module 131 may collect the window buffer allocated to the memory 120 for an app, a frequency of execution of which is low. For another example, the window buffer management module 131 may collect the window buffer allocated to the memory 120 for an app which is run before a specified time on the basis of a current time.

According to another embodiment, the window buffer management module 131 may collect the window buffer allocated to the memory 120 for the app, at least a portion of the image of which is not displayed on the display 110, depending on a request associated with allocation of the window buffer from at least one app.

For example, when the whole of the image of the first app 123_1 is displayed on the display 110, the window buffer management module 131 may fail to collect the window buffer allocated to the memory 120. When only a portion of the second app 123_2 is displayed on the display 110 by the image of the first app 123_1, the window buffer management module 131 may collect some of the window buffers allocated to the memory 120. When images of the third app 123_3 and the fourth app 123_4 are not displayed on the display 110, the window buffer management module 131 may collect all the window buffers allocated to the memory 120.

According to an embodiment, the window buffer management module 131 may collect the window buffers allocated to the memory 120 for the run app depending on specified priorities. For example, the window buffer management module 131 may collect a window buffer except for a specified number among window buffers allocated to the memory 120 for an app (or the first app 123_1) having the highest priority among the specified priorities. For example, when two or less window buffers are allocated to the memory 120 for the run app, the specified number may be one. According to an embodiment, the window buffer management module 131 may collect the window buffer allocated to the memory 120 for the second app 123_2 having a low priority among the specified priorities.

According to an embodiment, the specified priorities may be determined on the basis of at least one of a state where an app, at least a portion of the image is not displayed, is displayed on the display 110, a frequency of execution of the app, and a time when the app is run. A plurality of applications, at least some of the images are not displayed on the display 120, may include the first app 123_1 having the highest priority among the priorities and the second app 123_2 having a low priority among the priorities. Thus, the window buffer management module 131 may collect a window buffer except for a specified number among window buffers allocated to the memory 120 for the run first app 123_1. Furthermore, the window buffer management module 131 may collect all of window buffers allocated to the memory 120 for the second app 123_2.

According to an embodiment, the window buffer management module 131 may first collect a front window buffer among window buffers allocated to the memory 120 for an app (or the first app 123_1), the whole of the image of which is not displayed on the display 110. According to an embodiment, the window buffer management module 131 may first collect a back window buffer allocated to the memory 120 for an app (or the second app 123_2), at least a portion of the image of which is not displayed on the display 110. Furthermore, the window buffer management module 131 may first allocate the front window buffer for the app (or the second app), the at least a portion of the image of which is not displayed on the display 110.

According to an embodiment, when displaying the app (or the first app 123_1), an image (e.g., a UI image) of which is not displayed on the display 110, again on the display 110, the window buffer management module 131 may allocate a window buffer to the app to be displayed again on the display 110.

For example, when a window buffer is not allocated to the memory 120 for an app (or the first app 123_1), the image of which is not displayed on the display 110, among at least one run app, the window buffer management module 131 may allocate a back window buffer for the app to the memory 120. The processor 130 may deliver a request to the first app 123_1 to store the image in the allocated back window buffer. When the image is stored in the allocated back window buffer, the window buffer management module 131 may allocate (or specify) the back window buffer to a front window buffer. The image display module 132 may display the image stored in the front window buffer on the display 110.

For example, when a window buffer is allocated to the memory 120 for an app (or the second app 123_2) which is not displayed on the display 110 among at least one run app, the window buffer management module 131 may display the image (or the first image) stored in the front window buffer allocated to the memory 120 for the app on the display 110. The window buffer management module 131 may allocate a back window buffer for storing a second image displayed on the display 110, which is subsequent to the first image, to the memory 120 for the second app 123_2.

According to another embodiment, the window buffer management module 131 may allocate a new window buffer to the memory 120 for an app, the image of which is not displayed on the display 110, depending to a request associated with allocating the window buffer from at least one app.

Figure 3:
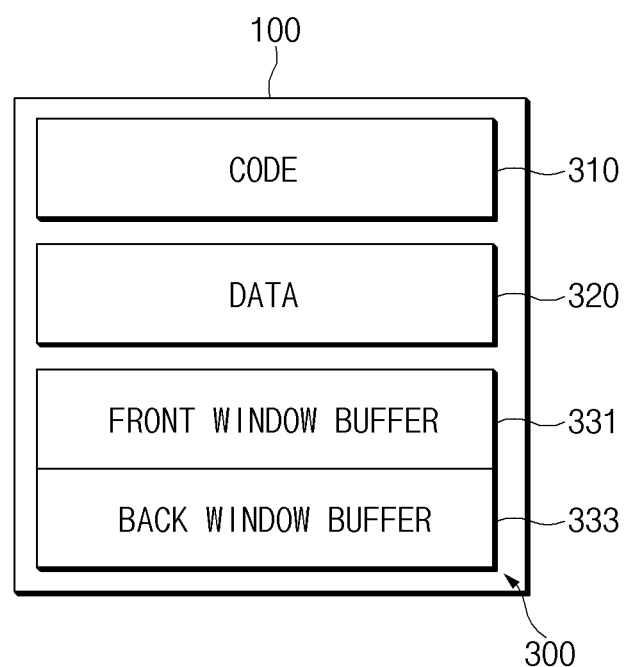
FIG. 3 is a drawing illustrating allocating at least a part of a process memory for a run app in a display device according to an embodiment.

FIG. 3 is a drawing illustrating allocating at least a part of a process memory for a run app in a display device according to an embodiment.

Referring to FIG. 3, a display device 100 (e.g., a processor 130) may allocate a code storage unit 310, a data storage unit 320, and a window buffer 331, 333 to a run app 300.

According to an embodiment, the code storage unit 310 may store instructions for performing a function of the run app 300. According to an embodiment, the processor 130 may perform a specified function depending on the instructions stored in the code storage unit 310.

According to an embodiment, the data storage unit 320 may store information necessary for executing the specified function. According to an embodiment, the processor 130 may use information stored in the data storage unit 320 when performing the specified function depending on the instructions stored in the code storage unit 310.

According to an embodiment, the window buffer 331, 333 may store an image to be displayed on the display 110. According to an embodiment, the processor 130 (e.g., a window buffer management module 131) may allocate a front window buffer storing an image (or a first image) currently displayed on the display 110 and a back window buffer storing an image (or a second image) displayed on the display 110, which is subsequent to the first image, to a memory for the run app 300.

Figure 4:
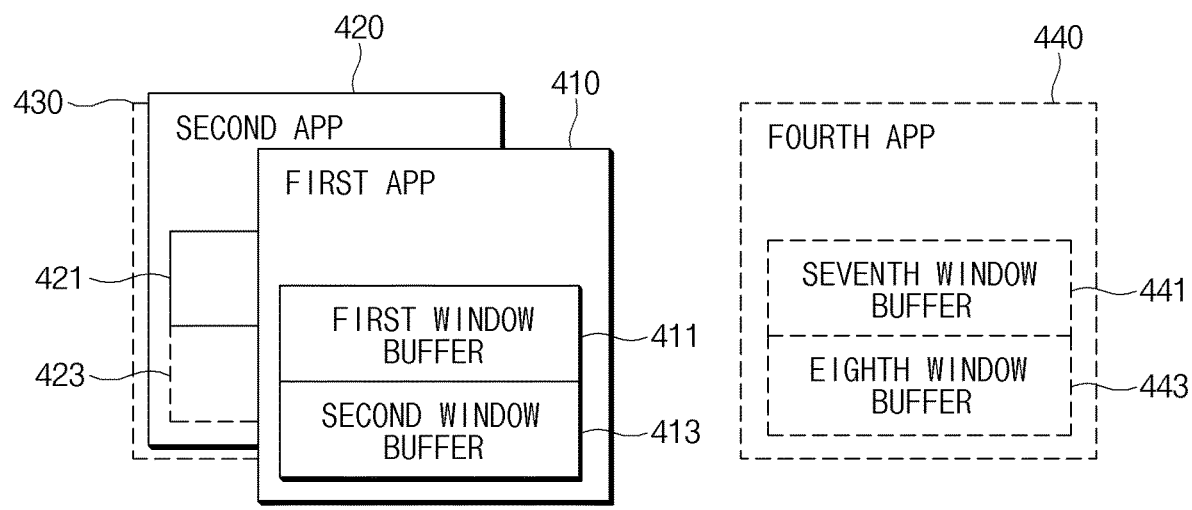
FIG. 4 is a drawing illustrating allocating a window buffer to a memory for a plurality of run apps in a display device according to an embodiment.

FIG. 4 is a drawing illustrating allocating a window buffer to a memory for a plurality of run apps in a display device according to an embodiment.

Referring to FIG. 4, a display device 100 (e.g., a window buffer management module 131) may collect a window buffer allocated to a memory in a state where a plurality of run apps are displayed on a display 110.

According to an embodiment, the display device 100 may run first to fourth apps 410 to 440. According to an embodiment, the display device 100 may display at least some of images of the first to fourth apps 410 to 440 on the display 110. For example, the display device 100 may run the first app 410 and may display the whole of the image of the first app 410 on the display 110. The display device 100 may display at least a portion of the image of the second app 420 to be overlapped with the first app 410. The display device 100 may display the whole of the image of the third app 430 on the display 110 to be overlapped with the image of the second app 420. The display device 100 may fail to display an image of the fourth app 440 on the display 110.

According to an embodiment, when running the first to fourth apps 410 to 440, the display device 100 may allocate two window buffers to the memory for the run app. The two window buffers may be, for example, a front window buffer and a back window buffer. For example, when running the first to fourth apps 410 to 440, the display device 100 may allocate first to eighth window buffers 411a to 443 to the memory by two.

According to an embodiment, the display device 100 (e.g., the window buffer management module 131) may collect (or allocate) the window buffer allocated to the memory depending on a state where the first to fourth apps 410 to 440 are displayed on the display 110.

For example, the display device 100 may allocate the first window buffer 411 and the second window buffer 413 to the first app 410, the whole of which is displayed on the display 110. In other words, the display device 100 may fail to collect the window buffer allocated for the first app 410. The first window buffer 411 may be, for example, a front window buffer. The second window buffer 413 may be a back window buffer. The display device 100 may collect the fourth window buffer 423 allocated to the memory for the second app 420, at least a portion of which is displayed on the display 110. The fourth window buffer 423 may be, for example, a back window buffer. The third window buffer 421 may maintain a state where it is allocated to the memory for the second 420. The third window buffer 421 may be, for example, a front window buffer. The display device 100 may collect the fifth to eighth window buffers 443 allocated to the memory for the third app 430, the whole of which is not displayed, and the fourth app 440. According to an embodiment, when the whole of the second app 420 is displayed again on the display 110, the display device 100 may display an image (or a first image) stored in the third window buffer 421 on the display 110. The display device 100 may allocate the fourth window buffer 423 for storing an image displayed subsequent to the first image to the memory for the second app 420.

According to an embodiment, when the whole of the image of the third app 430 is displayed again on the display 110, the display device 100 may allocate the sixth window buffer (not shown) to the memory for the third app 430. The display device 100 may transmit a request to the app 430 to store the image in the sixth window buffer. The display device 100 may specify the sixth window buffer as a front window buffer and may display the image stored in the sixth window buffer on the display 110. According to an embodiment, when displaying the whole of the fourth app 440 on the display 110, the display device 100 may operate in a similar manner to the third app 430.

According to various embodiments of the disclosure described with reference to FIGS. 1 to 4, the display device 100 may efficiently use limited memory resources by variably collecting the window buffer allocated to the memory depending on a state of an app, an image of which is not displayed on the display, among the run apps.

Figure 5:
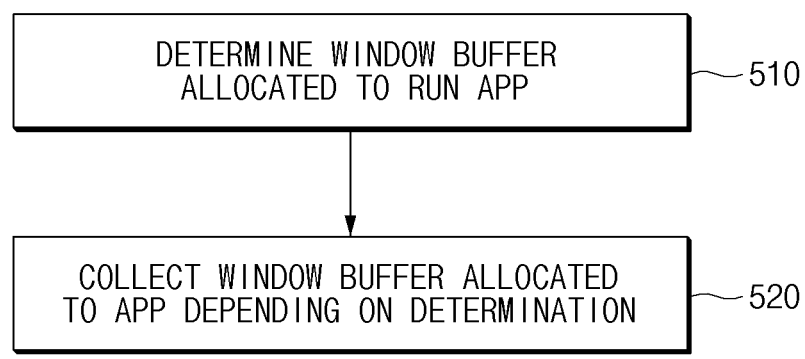
FIG. 5 is a flowchart illustrating a control method of a display device according to various embodiments of the disclosure.

FIG. 5 is a flowchart illustrating a control method of a display device according to various embodiments of the disclosure.

The flowchart shown in FIG. 5 may be configured with operations processed by the above-mentioned display device 100. Thus, although there are contents omitted below, contents described about the display device with reference to FIGS. 1 to 4 are applicable to the flowchart shown in FIG. 5.

According to an embodiment, in operation 510, the display device 100 may determine a window buffer allocated to an app, an image of which is not displayed on a display 110, based on a state of the app, the image of which is not displayed on the display 110, among at least one run app. For example, the display device 100 may determine window buffers allocated to a memory for the app, the image of which is not displayed on the display 110, depending on specified priorities. The specified priorities may be determined on the basis of at least one of, for example, a state where an app is displayed on the display 110, a frequency where a user runs the app, and a time when the app is run.

According to an embodiment, in operation 520, the display device 100 may collect the window buffer allocated to the memory for the app, which is not displayed on the display 100, or may allocate a new window buffer, depending on the determination. For example, the display device 110 may collect window buffers except for a specified number among window buffers allocated to a first app having the highest priority among the specified priorities. Furthermore, it may be configured to collect a window buffer allocated to the memory for a second application having a low priority among the specified priorities.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. The computer-readable storage medium may include a hard disk, a floppy disk, a magnetic medium (e.g., a magnetic tape), an optical medium (e.g., a CD-ROM or a DVD), a magneto-optical medium (e.g., a floptical disk), an internal memory, or the like. The instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display device, comprising:
a display;
a memory; and
a processor operatively coupled to the display and the memory, wherein the processor is configured to:
run at least a first application and a second application stored on the memory;
allocate a front window buffer and a back window buffer to each of the first application and the second application on the memory; and
display a first image associated with the first application and a second image associated with the second application based on the front window buffer and the back window buffer which are allocated to each of the first application and the second application; and
in response to identifying that identify whether at least a portion of the first image is not displayed on the display by overlapping the first image with the second image, retrieve at least one of retrieve the front window buffer and the back window buffer which are allocated to the first application,
wherein the processor is further configured to,
in response to identifying that a whole of the first image is not displayed on the display while the first image is not overlapped with the second image, retrieve the front window buffer and the back window buffer which are allocated to the first application, and
wherein the front window buffer is used for storing a current image currently displayed on the display and wherein the back window buffer is used for storing a subsequent image to be displayed on the display after the current image.

2. The display device of claim 1, wherein the processor is further configured to:
in response to identifying that the portion of the first image is not displayed on the display by overlapping the first image with the second image, retrieve the back window buffer allocated to the first application.

3. The display device of claim 1, wherein the processor is further configured to:
in response to identifying that the whole of the first image is not displayed on the display by overlapping the first image with the second image, retrieve the front window buffer and the back window buffer which are allocated to the first application.

4. The display device of claim 1, wherein the processor is further configured to, at least one of:
in response to identifying that the whole of the first image and a whole image of the second image are displayed on the display while the first image is not overlapped with the second image, display the first image based on the front window buffer and the back window buffer allocated to the first application and display the second image based on the front window buffer and the back window buffer allocated to the second application.

5. The display device of claim 1, wherein the processor is further configured to:
in response to identifying that if the whole image of the first image is displayed again on the display after retrieving at least one of the front window buffer and the back window buffer, allocate at least one of the front window buffer and the back window buffer to the first application.

6. The display device of claim 1, wherein the processor is further configured to:
receive a request associated with retrieving the at least one of the front window buffer and the back window buffer from the first application; and retrieve a window buffer allocated to an application, the at least a portion of the image is not displayed on the display, in response to the received request.

7. The display device of claim 1, wherein the processor is configured to:
select an application among the first application and the second application based on specified priorities; and
retrieve at least one of the front window buffer and the back window buffer which are allocated to the selected application.

8. The display device of claim 7, wherein the specified priorities are determined based on at least one of a frequency of execution of the at least one application, and a time when the at least one application is running.

9. A control method of a display device, the method comprising:
running a first application and a second application;
allocating a front window buffer and a back window buffer to each of the first application and the second application on a memory of the display device;
displaying a first image associated with the first application based on the front window buffer and the back window buffer which are allocated to the first application and displaying a second image associated with the second application based on the front window buffer and the back window buffer which are allocated to the second application;
in response to identifying that at least a portion of the first image is not displayed on the display by overlapping the first image with the second image, retrieving at least one of the front window buffer and the back window buffer which are allocated to the first application; and
in response to identifying that the whole of the first image is not displayed on the display while the first image is not overlapped with the second image, retrieving the front window buffer and the back window buffer which are allocated to the first application,
wherein the front window buffer is used for storing a current image currently displayed on the display and wherein the back window buffer is used for storing a subsequent image to be displayed on the display after the current image.

10. The method of claim 9, further comprising:
selecting an application among the first application and the second application based on specified priorities; and
retrieving at least one of the front window buffer and the back window buffer which are allocated to the selected application.

11. The method of claim 10, wherein the specified priorities are determined based on at least one of a frequency of execution of the at least one application, and a time when the at least one application is running.

12. The method of claim 9, further comprising:
in response to identifying that the portion of the first image is not displayed on the display by overlapping the first image with the second image, retrieving the back window buffer allocated to the first application.

13. The method of claim 9, further comprising:
in response to identifying that the whole of the first image is not displayed on the display by overlapping the first image with the second image, retrieving the front window buffer and the back window buffer which are allocated to the first application.

14. The method of claim 9, further comprising in response to identifying that the whole of the first image and a whole image of the second image are displayed on the display while the first image is not overlapped with the second image, displaying the first image based on the front window buffer and the back window buffer allocated to the first application and the second image based on the front window buffer and the back window buffer allocated to the second application.

15. The method of claim 9, further comprising:
in response to identifying that the whole image of the first image is displayed again on the display after retrieving the front window buffer and the back window buffer, allocating the front window buffer and the back window buffer to the first application.

* * * * *